3,403,144
PROCESS FOR THE PREPARATION OF
SULFURYL FLUORIDE
Hung Kei H. Lam, San Pablo, Calif., and Harold T.
Fullam, Richland, Wash., assignors to Stauffer Chemical Company, New York, N.Y., a corporation of Delaware
No Drawing. Filed Jan. 15, 1964, Ser. No. 337,712
2 Claims. (Cl. 23—203)

ABSTRACT OF THE DISCLOSURE

Sulfuryl fluoride is prepared by reacting the fluoride or hexafluorosilicate of either barium or strontium with sulfur trioxide vapors at an appropriate temperature and retention time. Illustrative of preparing the reactants, barium fluoride may be produced by treating an aqueous solution of barium sulfide with hydrogen fluoride, while barium hexafluorosilicate is obtainable by dissolving barium sulfide in a 5% HCl solution and reacting the filtered solution with fluosilicic acid. The sulfur trioxide vapor is provided by heating 65% oleum, and supplying said vapor with helium gas as a carrier.

---

This invention relates to a new and novel process for the production of sulfuryl fluoride. More particularly, this invention is concerned with a process whereby the fluorine values of hydrogen fluoride, silicon tetrafluoride and fluosilicic acid may be utilized in producing high yields of sulfuryl fluoride.

Recently there have been several U.S. patents issued describing processes for preparing sulfuryl fluoride from sulfur dioxide, chlorine and hydrogen fluoride. However, while these processes yield substantial quantities of sulfuryl fluoride, it can be imagined that there is a problem in the separation and purification of the desired sulfuryl fluoride. There is a possibility in this type of reaction to produce a large number of gaseous products, many of which boil below room temperature, thus their separation by conventional fractional distillation becomes a task.

Another method of the prior art for the production of sulfuryl fluoride is the combination of sulfur dioxide and elementary fluorine. This reaction, however, is very difficult to control.

It is an object of this invention to provide an efficient process for producing sulfuryl fluoride and, because of the reagents involved, is economical to employ.

A more specific object is a process for preparing sulfuryl fluoride which avoids the use of elementary fluorine and also avoids the production of a large number of gaseous by-products.

Pursuant to the above mentioned and yet further objects, it has been found that the fluorine values of hydrogen fluoride, silicon tetrafluoride and fluosilicic acid can be utilized with barium sulfide to prepare pure sulfuryl fluoride in good yields with sulfur trioxide.

It is known, in the prior art, that barim fluorosulfonate can be thermally decomposed to produce sulfuryl fluoride. According to the present invention sulfuryl fluoride can be produced according to the following reactions:

(1)

(a) $\quad BaS + 2HF \rightarrow BaF_2 + H_2S\uparrow$ (b) $2BaS + 3SiF_4 + 2H_2O \rightarrow$
$\quad\quad\quad 2BaSiF_6 + SiO_2 + H_2O + H_2S\uparrow$ (c) $\quad BaS + H_2SiF_6 \rightarrow BaSiF_6 + H_2S\uparrow$ (2)

(a) $\quad BaF_2 + 2SO_3 \rightarrow BaSO_4 + SO_2F_2$ (b and c) $BaSiF_6 + 2SO_3 \rightarrow BaSO_4 + SiF_4 + SO_2F_2$ The process involves, first, the reaction of an aqueous solution of barium sulfide with hydrogen fluoride, silicon tetrafluoride or fluosilicic acid. Secondly, the barium fluoride or barium hexafluorosilicate produced was placed in a suitable reactor and heated. Sulfur trioxide vapor was passed over the heated inorganic fluoride and substantially pure sulfuryl fluoride was produced.

The primary use of commercial barium fluoride is prohibited because of the economics involved. However, by employing the method of synthesis from commercially available and inexpensive barium sulfide and hydrogen fluoride, this reaction becomes feasible.

In the embodiment of this invention the preparation of sulfuryl fluoride from barium fluoride or barium hexafluorosilicate and sulfur trioxide is carried out in one step. The reaction is conducted by passing sulfur trioxide over barium fluoride or barium hexafluorosilicate. The temperature is maintained between about 500° and 650° C., preferably between about 550° and 650° C. While the pressure usually employed is slightly above atmospheric in a continuous system, higher pressures up to 100 atmospheres may be employed if desired.

The material of construction of the reactor is not important; metal, quartz, or equivalent reaction equipment may be used. It is only necessary that the material be able to withstand the temperatures involved and to resist attack by the sulfur trioxide vapors.

It has been mentioned that this reaction can be carried out at atmospheric pressure. This has the distinct advantage of being easily adaptable to continuous flow systems. The retention time is not critical. Satisfactory results were obtained with retention times of 1 to 60 seconds. Our preferred range is from 5 to 20 seconds.

The sulfuryl fluoride produced in this reaction can be worked up by scrubbing with concentrated sulfuric acid to remove excess sulfur trioxide and by water to remove silicon tetrafluoride. The sulfuryl fluoride was then dried and bottled in pressure resistant containers for storage and subsequent use. Better than 96% sulfuryl fluoride purity was obtained by this process even without further purification. Sulfuryl fluoride finds its largest use as a termiticide and fumigator.

The barium sulfate produced as a by-product in the reaction can be reduced by any known method, such as with carbon, to recover barium sulfide. The barium sulfide can then be recycled into Equations 1a, 1b and 1c above. This step also decreases the economics involved in the process by making the barium values reusable.

It should also be mentioned that the present invention is equally applicable for strontium containing compounds in place of the barium compound used above. Whereas the availability and economics of using strontium compounds may be prohibitive, the use of barium compounds is preferred.

The following examples illustrate the present invention.

Example 1

This example illustrates the process using as raw materials hydrogen fluoride, barium sulfide and sulfur trioxide. In the first step barium sulfide in an aqueous solution was treated with hydrogen fluoride to precipitate the sparingly soluble barium fluoride. The barium fluoride was recovered and dried. Pellets were prepared of the barium fluoride. The pellets (80 g.) were placed in a vertical reactor tube made of Vycor. The reactor was heated externally by a tube furnace to a controlled temperature of 500° to 600° C. Sulfur trioxide vapors produced from heating 65% oleum was passed through the heated, packed reactor with a helium carrier gas. The reactor was attached to a train consisting of a trap containing 98% sulfuric acid to absorb excess sulfur trioxide, a Dry Ice-methanol trap (−78° C.), a liquid nitrogen trap and a mercury seal.

During two hours of reaction time, 60 g. of sulfur trioxide was used. The sulfur trioxide retention time was about 5.5–6.0 seconds. At the end of the reaction 36.2 g. of product was obtained. This product analyzed 94.0% sulfuryl fluoride, 5% silicon tetrafluoride and 1.0% unknown compound. Analysis of the pellet residue showed that 90% of the barium fluoride originally present had been converted into barium sulfate.

Example 2

This example illustrates the preparation of sulfuryl fluoride using as raw materials barium sulfide, fluosilicic acid and sulfur trioxide. In this reaction barium sulfide was first dissolved in a stoichiometric quantity of 5% hydrochloric acid. Following, the solution was filtered and the filtrate was reacted with a stoichiometric quantity of 30% fluosilicic acid. The barium hexafluorosilicate precipitated and was filtered, washed and dried. This product was found to be pure barium hexafluorosilicate ($BaSiF_6$) by X-ray analysis.

The barium hexafluorosilicate prepared by the above method was pelletized. The pellets (38.5 g.) were placed in a reactor as in Example 1. The apparatus used was similar to that in Example 1 except that the exhaust gases from the reactor were passed through a solution of sodium chloride and then through a column of anhydrous calcium sulfate before being condensed.

The reactor was heated to 600° C. Sulfur trioxide vapors were supplied in a similar manner from heated 65% oleum with a helium gas carrier. After 1 hour of reaction it was found that the barium hexafluorosilicate charge in the reactor had been converted to barium sulfate. There was condensed in the traps 7.7 grams of 96% pure sulfuryl fluoride. The weight gain shown by the sodium chloride solution indicated that the stoichiometric quantity of silicon tetrafluoride had been obtained from the barium hexafluorosilicate during the reaction.

The barium sulfate produced in the above examples can be reduced to barium sulfide suitable for recycling by the reaction with carbon at 800° C. in an atmosphere of natural gas.

Various changes and modifications may be made in the process described herein as will be apparent to those skilled in the chemical arts. It is accordingly intended that the present invention shall only be limited by the scope of the appended claims.

We claim:
1. A process for the preparation of sulfuryl fluoride comprising reacting sulfur trioxide vapor with barium hexafluorosilicate at a temperature between about 500° C. to 650° C. with a retention time of 1 to 60 seconds and isolating said sulfuryl fluoride.
2. A process for the preparation of sulfuryl fluoride comprising reacting sulfur trioxide vapor with strontium hexafluorosilicate at a temperature between about 500° C. to 650° C. with a retention time of 1 to 60 seconds and isolating said furfuryl fluoride.

References Cited

UNITED STATES PATENTS

| | | | |
|---|---|---|---|
| 1,457,436 | 6/1923 | Howard et al. | 23—137 |
| 1,648,143 | 11/1927 | McQuaid | 23—88 |
| 1,685,772 | 10/1928 | Booge et al. | 23—137 |
| 2,410,043 | 10/1946 | Breton et al. | 23—88 |
| 2,800,389 | 7/1957 | Mockrin | 23—88 |
| 2,801,904 | 8/1957 | Muetterties | 23—203 |
| 3,132,925 | 5/1964 | Pacini et al. | 23—203 |
| 3,146,068 | 8/1964 | Soulen | 23—203 |

OTHER REFERENCES

Mellor—"Comprehensive Treatise On Inorganic and Theoretical Chemistry," vol. 6, part 2, 1925, p. 944, Longmans, Green and Co., N.Y.

OSCAR R. VERTIZ, *Primary Examiner.*

B. H. LEVENSON, *Assistant Examiner.*